Sept. 15, 1942.  B. G. CARLSON  2,295,829
VIBRATION DAMPENER
Filed Nov. 29, 1940
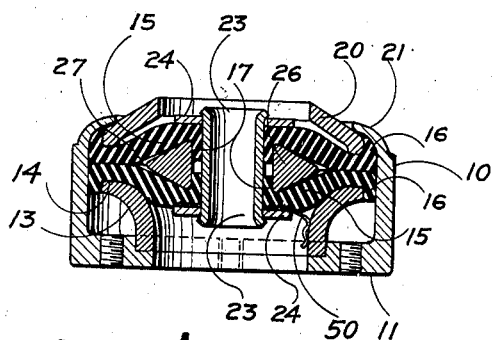
Fig-1-
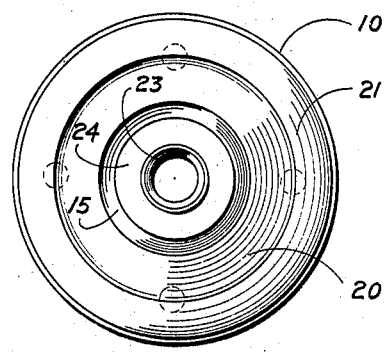
Fig-2-
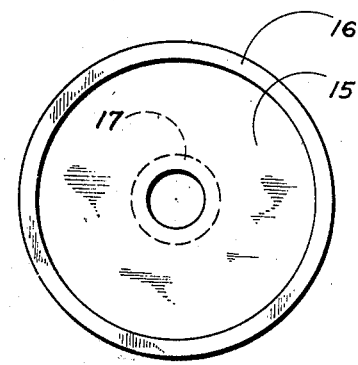
Fig-3-
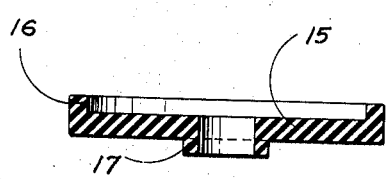
Fig-4-
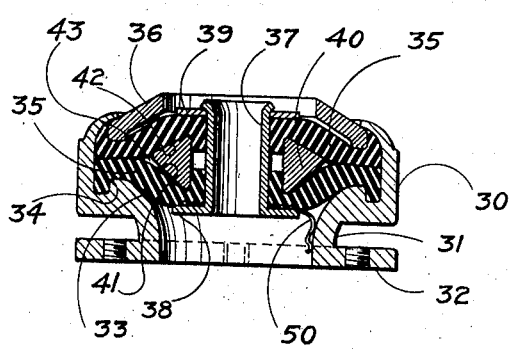
Fig-5-
INVENTOR.
BERT G. CARLSON
BY
ATTORNEYS Patented Sept. 15, 1942

2,295,829

UNITED STATES PATENT OFFICE 2,295,829

VIBRATION DAMPENER

Bert G. Carlson, Willobee, Ohio, assignor to The Weatherhead Company, Cleveland, Ohio, a corporation of Ohio Application November 29, 1940, Serial No. 367,815

10 Claims. (Cl. 248—358)

This invention relates broadly to flexible connectors and more specifically to vibration dampeners of the type employed for the mounting of static or vibratory loads in any position.

In the mounting or connecting of delicate and sensitive instruments upon a panel board or the like it is essential that they be insulated or cushioned against undue vibratory motion. Thus in the construction of airplanes the assembling of the instrument panel is of foremost importance, in that the resilient mountings for the instruments, radio equipment and such must be capable of absorbing not only the high frequency vibrations generated by the airplane engines but also vibrations and shocks of different types, such as are created by rough air or hard landings. Furthermore, the vibration dampeners or mountings must be constructed in such a manner as to be capable of compensating for any sag occurring in the resilient material, which usually results from usage and the age of the material.

One of the objects of the present invention is the provision of a vibration dampener having a resilient element secured to an outer casing and adapted to cooperate with an inner article supporting member to cushion all vibratory motion thereof. Another object is to provide a vibration dampener having an outer casing so designed as to assist in guiding and limiting the movement of the inner article supporting member and in preventing it from sagging. Another object is to provide a vibration dampener embodying an outer casing having means for positively limiting the axial movement of the inner supporting member. A further object is to provide a simple and compact vibration dampener embodying a plurality of resilient discs having a liquid cushioning element interposed therebetween for damping the vibratory movement of the inner article supporting member. Still further objects are to provide such a vibration dampener which is light in weight, economical of manufacture, simple in construction, reliable and efficient in service and which is susceptible of ready attachment to other objects.

Other objects and advantages more or less ancillary to the foregoing and the manner in which all the various objects are realized will appear in the following description, which considered in connection with the accompanying drawing, sets forth the preferred embodiment of the invention.

I preferably accomplish the above and other objects of the invention by providing an annular casing having a flange and ring disposed therein with a plurality of superposed discs of resilient material secured therebetween and with an inner article supporting member anchored to the inner edge of the discs by a spacing collar which engages the flange and ring for limiting the axial movement of the supporting member. Preferably the resilient discs are spaced apart at their inner edges by a collar to facilitate the disposition of a liquid cushioning element therebetween which is adapted to cooperate with the discs for damping the vibratory movement of the supporting member. The resilient discs are preferably arranged so that they are subjected principally to stresses in compression and tension by the movement of the supporting member and further are adapted to conform to the contour of the flange and ring disposed within the outer casing for restraining and limiting the axial movement of the supporting member.

Referring to the drawing wherein the preferred embodiment of the invention is illustrated, Fig. 1 is a vertical sectional view of a vibration dampener constructed according to the present invention; Fig. 2 is a plan view of the vibration dampener shown in Fig. 1; Fig. 3 is a plan view of one of the resilient damping elements disclosed in Fig. 1; Fig. 4 is a transverse sectional view of the resilient damping element showing the beads formed on the inner and outer edges thereof, the view being taken on a plane indicated by line 4—4 of Fig. 3; and Fig. 5 is a vertical sectional view of a modified form of the vibration dampener.

Referring to Fig. 1, there is shown a vibration dampener comprising an annular shell or casing 10 preferably formed from a light and durable metal, such as an aluminum alloy. The lower portion of the shell 10 has an inwardly projecting base 11 which is formed integrally therewith and is of a thickness greater than that of the shell. The base 11 is provided with a plurality of threaded openings for the reception of suitable fastening means, not shown, with which the vibration dampener may be secured to any suitable object.

The inner edge of the base 11 is recessed for the reception of a concentric ring or flange 13 which is secured thereto in any suitable manner. The flange 13 diverges towards the medial axis of the shell 10 and has the free end thereof spaced from the shell constituting a shoulder or a bearing seat 14. A pair of superposed perforated resilient discs 15, formed preferably of rubber, either natural or synthetic, are provided on their inner and outer edges with beads 16 and 17 respectively, with the beads 16 on the outer edge extending from the outer surface of the discs while the inner beads 17 extend inwardly from the inner or adjacent surfaces of the discs. The outer edge portion of the resilient discs is supported on the shoulder 14 with the bead 16 formed on the lowermost disc extending over the shoulder and interposed between the shell and shoulder. In order to clamp the outer edge of the discs to the shell a truncated cone ring 20 engages the resilient discs 15 within the upper portion of the annular shell 10 and has its base disposed in aligned relation with the shoulder 14. The outer bead 16 formed on the uppermost resilient disc 15 is interposed between the shell 10 and the base of the ring 20. The upper edge portion 21 of the shell 10 is curved inwardly, preferably by rolling or spinning, and is adapted to engage the lower portion of the ring 20 for compressively urging the ring and resilient discs 15 against the shoulder 14 and the inner surface of the shell 10.

A tubular inner article supporting member 23 is disposed within the opening in the superposed resilient discs 15 with the opposed inner beads 17 extending along the peripheral surface of the supporting member parallel to the longitudinal axis thereof. The ends of the supporting member 23 have washers 24 affixed thereto for aiding in the retention of the supporting member within the resilient discs. Interposed between the resilient discs 15 there is a wedge shaped spacing collar 26 which encircles the inner beads 17 and the supporting member 23 for compressively urging the beads 17 against the washers 24 and the supporting member. The size of the spacing collar is such that it will engage the flange 13 and ring 20 to limit the axial movement of the supporting member 23 and also to prevent excessive sagging of the resilient discs and supporting member. A suitable liquid 27, such as water, may be retained between the resilient discs to aid the discs in cushioning the vibratory movement of the supporting member.

In the use of the vibration dampener for mounting instruments upon an airplane instrument panel, the annular shell 10 is secured to the panel by suitable fastening means inserted within the openings formed in the base 11. The instrument which is to be mounted upon the panel is then secured to the inner supporting member 23 in any desired manner such as by a stud or bolt affixed thereto. Thus with the resilient discs 15 interposed between the annular shell 10 and the supporting member 23 any vibratory motion developed by the airplane is cushioned by the resilient discs and the liquid 27. The contour of the inner surface of the flange 13 and ring 20 is such that upon the axial movement of the supporting member 23 the resilient disc adjacent the flange or ring will conform to the contour thereof while the other disc will be placed under a slight tension. When the instrument secured to the supporting member 23 is subjected to an unusual vibratory motion or shock the spacing collar 26 and resilient discs 15 engage the flange 13 or ring 20 for limiting and cushioning the relative movement between the supporting and supported members and prevents undue stretching of the resilient discs.

In the modified form of the vibration dampener disclosed in Fig. 5 the annular shell 30 has a reduced neck 31 formed in the lower portion thereof, preferably by a spinning or swaging operation. An integrally formed base member 32 projects outwardly from the neck and is provided with a plurality of openings therethrough for securing the shell to any suitable object. Contemporaneously with the neck forming operation an integral internal flange 33 is formed within the shell diverging towards the medial axis thereof with the innermost portion thereof spaced from the shell and constituting a shoulder 34. The resilient discs 35 and truncated cone ring 36 are similar to those disclosed in Fig. 1.

The tubular inner article supporting member 37 has an outwardly extending lip 38 on one end thereof, while the opposed end has a washer 39 affixed thereon subsequent the insertion of the supporting member within the opening in the resilient discs 35. A wedge shaped spacing collar 40 is interposed between the resilient discs 35 for anchoring the inner edges thereof to the supporting member 37. The collar 40 is not symmetrical in transverse section in that the lower face 41 is of greater length than the upper face 42 which causes the lower resilient disc 35 to be stretched more than the upper disc. Thus when the inner supporting member 37 is free of any load the resilient discs tend to equalize which results in the inner supporting member being moved upwardly with respect to the annular shell 30. However, the supporting member 37 is centralized within the annular shell 30 upon the placing of a load upon the member. A liquid 43 is disposed between the resilient discs to aid in cushioning the vibratory motion of the supporting member. The function of the vibration dampener disclosed in Fig. 5 is similar in all respects to the one shown in Fig. 1.

When the vibration dampener is employed as a shock mounting it is essential that an electrical contact or ground member be interposed between the inner article supporting member and the annular shell or casing for grounding any and all static electrical disturbances generated by the inner member which affect radio reception. To this end a flat coil spring 50 encircles the lower portion of the supporting member and is seated upon the inner face of the lower washer contiguous to the resilient disc with the free end thereof engaging the inner surface of the flange formed in the shell. Thus an adequate grounding element is provided eliminating static disturbances in the radio instruments.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A vibration dampener embodying an annular member and an inner article supporting member, a pair of superposed rubber discs secured to the annular member, a spacing collar encircling the inner supporting member and interposed between the rubber discs to anchor said discs thereto, a liquid damping medium between said discs and means disposed between said discs to limit the axial movement of the inner supporting member.

2. A vibration dampener comprising an annular casing, a concentric divergent flange therein constituting a shoulder, a pair of superposed perforated discs of resilient material seated on said shoulder, an inner supporting member disposed within the opening in said discs, a spacing collar encircling the supporting member and interposed between said discs for securing said member thereto, an inwardly curved upper edge on said casing, a conically shaped ring partially disposed under said upper edge adapted to anchor the outer edge of said discs against said shoulder and casing, said spacing collar having an external diameter such that it acts as a stop to limit the axial movement of said inner supporting member.

3. A vibration absorbing mounting comprising an annular shell, a concentric flange therein divergent to the medial axis thereof and constituting a shoulder, a plurality of perforated damping elements anchored to said shoulder by a conical shaped ring disposed within said shell, an inner supporting member positioned within the openings in said damping elements, a spacing collar interposed between said elements for clamping said supporting member thereto, liquid means between said elements, said shoulder being adapted to limit the axial movement of said collar and supporting member in one direction.

4. A vibration insulator embodying an annular shell having an inwardly curved upper edge, a concentric flange formed in said shell divergent to the medial axis thereof and constituting a shoulder spaced from the shell, a pair of superposed perforated resilient discs seated on said shoulder, beads formed on the outer and inner edges of said discs normal to the outer and inner surfaces thereof respectively, the outer bead on the lowermost disc interposed between said shoulder and shell, a cone shaped ring partially disposed under said curved upper edge for compressing said discs against said shoulder, the outer bead on the uppermost disc compressively urged against the shell by the base of the ring, an inner article supporting member disposed within the opening in said discs, a spacing collar interposed between said discs for compressing said inner beads against said supporting member, a liquid cushioning means between said resilient discs, said discs adapted to conform to the contour of said flange and ring upon the axial movement of the supporting member.

5. A vibration insulator embodying an annular shell having an inwardly curved upper edge, a concentric flange formed in said shell divergent to the medial axis thereof and constituting a shoulder spaced from the shell, a pair of superposed perforated resilient discs having lips formed on the inner and outer edges thereof supported on said shoulder with the outer lip on the lower disc interposed between the shell and shoulder, a truncated cone ring partially disposed under said curved upper edge compressively urging said disc against the shoulder, a channel shaped article supporting member disposed within the opening in said discs, a spacing collar interposed between said discs for anchoring said inner lips to the channel shaped supporting member, said flange and ring adapted to limit the axial movement of the spacing collar and supporting member.

6. A vibration dampener comprising an annular shell having an integrally formed shoulder in the lower portion spaced from the sides thereof, a resilient damping element supported on said shoulder with the outer edge thereof interposed between said shoulder and shell, a truncated cone ring seated on the damping element, a supporting member secured to the inner edge of the damping element, an inwardly curved edge on said shell overlapping a portion of said ring for compressively urging the ring and damping element against said shoulder.

7. A vibration dampener embodying an annular shell and an inner article supporting member, an outwardly flared flange secured to the base of and extending within said shell, said flange being spaced from the side of the shell and constituting a shoulder, a plurality of superposed perforated resilient discs seated on said shoulder with the outer edge of the lowermost disc interposed between said shell and shoulder, a conical ring seated on said discs with the outer edge of the topmost disc interposed between said shell and ring, an article supporting member secured within the opening in said discs, an inwardly curved edge on said shell overlapping a portion of said ring for compressively urging the ring against said flange to anchor the resilient discs to the shell.

8. A vibration absorbing mounting comprising an annular shell, a concentric flange therein divergent to the medial axis thereof and constituting a shoulder, a plurality of perforated damping elements anchored to said shoulder by a conical shaped ring disposed within said shell, an inner supporting member positioned within the openings in said damping elements, a spacing collar interposed between said elements for clamping said supporting member thereto, said shoulder being adapted to limit the axial movement of said collar and supporting member in one direction.

9. A vibration absorbing mounting comprising an outer casing and an inner supporting member, a pair of resilient, annular rubber members interposed between said casing and said supporting member, the inner edges of said rubber members being spaced apart and secured to said supporting member, the outer edges of said rubber members coinciding and being secured to said outer casing, and means including a collar disposed between said rubber members and movable with said inner supporting member for limiting the relative movement between said casing and said inner support.

10. A vibration dampener embodying an annular member and an inner member, a pair of rubber discs secured in fluid tight relationship at their outer edges to said annular member and secured in fluid tight relationship at their central portions to said inner member, said discs being spaced apart at their central portions, and a liquid damping medium disposed between said discs.

BERT G. CARLSON.